United States Patent [19]

Herb et al.

[11] Patent Number: 4,673,321
[45] Date of Patent: Jun. 16, 1987

[54] EXPANSION DOWEL

[75] Inventors: Armin Herb, Peissenberg; Robert Huegel, Kaufering, both of Fed. Rep. of Germany; Rudolf Leuthi, Niederwangen, Switzerland

[73] Assignee: Hilti Aktiengesellschaft, Fürstentum, Liechtenstein

[21] Appl. No.: 833,916

[22] Filed: Feb. 26, 1986

[30] Foreign Application Priority Data

Feb. 27, 1985 [DE] Fed. Rep. of Germany ....... 3506841

[51] Int. Cl.$^4$ ..................... F16B 13/04; E21D 20/00
[52] U.S. Cl. ........................... 411/40; 411/42; 411/61; 411/68; 405/259
[58] Field of Search ............. 411/21, 55, 60, 61, 411/77–80, 40, 42, 43, 63, 64, 68, 171; 228/137, 150; 52/704; 405/259

[56] References Cited

U.S. PATENT DOCUMENTS

| | | | |
|---|---|---|---|
| 1,999,818 | 4/1935 | McIntyre | 228/137 |
| 3,442,008 | 5/1969 | Johnson | 228/150 |
| 3,996,835 | 12/1976 | Chromy | 411/60 |
| 4,147,444 | 4/1979 | Herb et al. | 405/259 |
| 4,342,527 | 8/1982 | White | 411/60 |

FOREIGN PATENT DOCUMENTS

| | | | |
|---|---|---|---|
| 2434502 | 1/1976 | Fed. Rep. of Germany | 411/68 |
| 444580 | 2/1968 | Switzerland | 411/68 |

Primary Examiner—Gary L. Smith
Assistant Examiner—Neill Wilson
Attorney, Agent, or Firm—Toren, McGeady & Associates

[57] ABSTRACT

An expansion dowel includes an axially extending expansion sleeve and an expansion member rolled from a section of sheet metal. The sleeve has a leading end and a trailing end and the inside surface of the sleeve is threaded for an axially extending section from the trailing end. The thread is formed before the sheet metal is rolled. To assure there is no misalignment of the thread along the butt joint, tangs and recesses are formed along the edges of the butt joint so that the edges interengage one another when the sheet metal section is rolled. By interengaging the butt joint edges, the sleeve does not expand circumferentially when a bolt is threaded into the trailing end of the sleeve.

11 Claims, 15 Drawing Figures

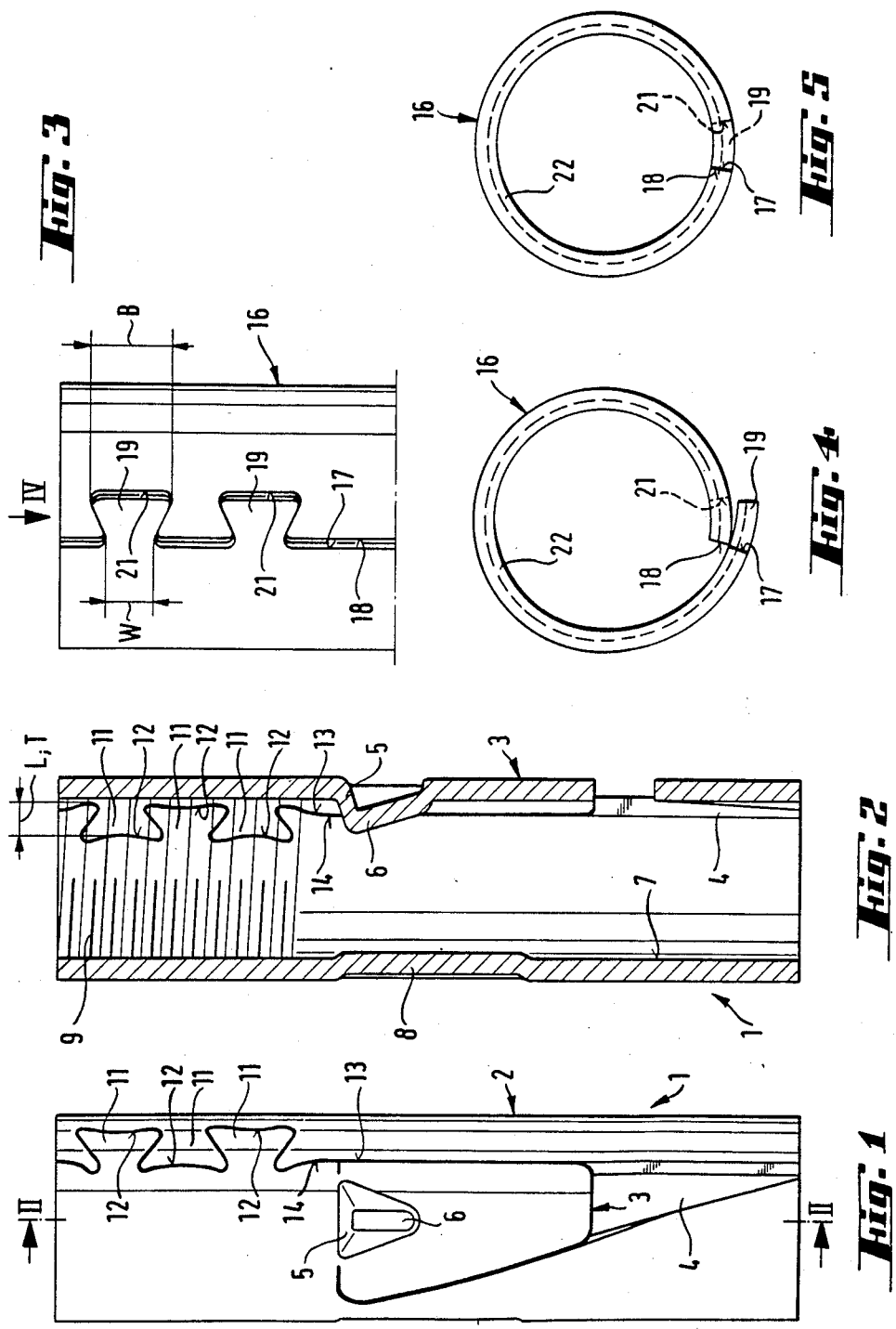

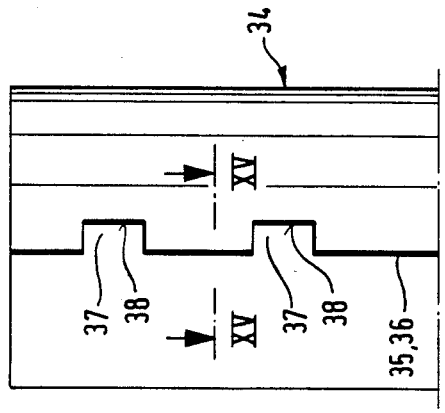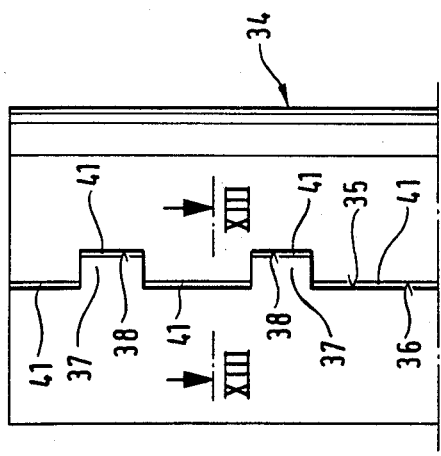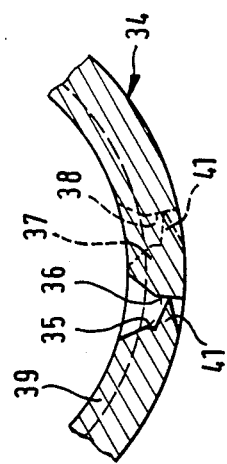

EXPANSION DOWEL

BACKGROUND OF THE INVENTION

The present invention is directed to an expansion dowel formed by an expansion sleeve and an expansion member rolled from a section of sheet metal with the axially extending edges of the expansion sleeve forming a butt joint and with the inside surface of the sleeve being threaded from its trailing end for applying a load to the sleeve. Further, the sleeve has a recess adjacent its leading end in which the expansion member is held with the sides of the recess converging in the direction the leading end.

Expansion dowels including an expansion sleeve rolled from sheet metal are distinguished particularly by low costs. A known expansion dowel of this type is fabricated in one piece with a wedge-shaped expansion member formed in the sleeve and connected to it by a web. The web can be broken when the expansion of the sleeve is commenced. The expansion member, with the web broken, is driven forwardly through an opening in the wall of the expansion sleeve with the opening narrowing in a wedge-shaped manner toward the leading end of the sleeve, that is, the end first inserted into a borehole in which the expansion dowel is anchored.

A thread is formed in the trailing end section of the expansion sleeve for applying a load or force on the dowel after it is anchored in place. The thread can be formed in a stamping operation before the section of sheet metal is rolled into the expansion sleeve.

When the expansion sleeve is rolled there is the problem that the individual thread turns are not properly aligned in the axial direction of the sleeve along the butt joint formed by the axially extending edges of the sheet metal section. Such a problem may interfere with the insertion of the threaded bolt into the thread in the sleeve. Another problem in this known dowel is that the forces acting radially on the inside of the expansion sleeve due to the force applied by a threaded bolt, tend to widen the sleeve, if the borehole receiving the expansion dowel is diametrically oversized or if the receiving material in which the borehole is formed is soft and thus excessively yielding. To eliminate this problem it has been proposed to connect the adjacent axially extending edges forming the butt joint by soldering or welding. With such an arrangement there is the problem if the thread turns are misaligned that the misalignment is fixed. The insertion of the bolt into the threaded section of the expansion sleeve is, as a result, difficult to effect.

SUMMARY OF THE INVENTION

Therefore, the primary object of the present invention is to to form an expansion dowel including an expansion sleeve rolled from a section of sheet metal with an inside thread for applying a load to the sleeve with the thread being properly aligned at the axially extending butt joint of the sheet metal section so that a bolt can be adequately retained in the sleeve for applying a load.

In accordance with the present invention, the axially extending edges of the rolled sheet metal section forming the butt joint of the expansion sleeve are provided with tangs and recesses which interengage. At the completion of the rolling step, a tang located along one axial edge engages in a recess formed in the other edge. This coaction of the tangs and recesses assures a defined axial positioning of the axially extending edges relative to one another. Preferably a number of tangs and recesses are provided along the axial extending edges, however, it would be possible to provide the required interengagement with only one tang and an associated recess.

Widening of the expansion sleeve along the butt joint when a load is applied to the sleeve, can be prevented by joining the axially extending edges together by welding or soldering after the tangs and the recesses are in interengage- ment.

Advantageously, the inside width of the openings to the recesses is smaller than the base area of the recesses spaced circumferentially from the openings. Such a shaped arrangement of the recesses practically assures the play-free reception of the tangs within the recesses in the axial direction of the expansion sleeve. The tangs can be inserted into the recesses in the circumferential direction of the expansion sleeve or they can be introduced radially during the rolling operation. By sizing the region of the expansion sleeve containing the tangs and the recesses, the tangs can be widened so that they afford a rear gripping arrangement with the recesses. Such rear gripping arrangement prevents any widening of the expansion sleeve when a load is applied. Accordingly, a welded or soldered connection along the butt joint can be eliminated.

In one embodiment of the invention, the axial dimension of the tangs at their free ends is greater than where they are attached to the axially extending edge of the sleeve. Further, by appropriate deformation after the rolling operation, a gripping of the tangs in the recesses is provided resisting stressing in the circumferential direction. As a result, widening of the expansion sleeve is prevented.

To obtain an adequate gripping of the tangs in the recesses following the rolling operation, preferably the width of the tangs in the free end region exceeds the width of the opening of the recesses. In such an arrangement, the tangs are radially inserted into the recesses during the rolling procedure. By subsequent deformation of the region carrying the tangs and the recesses, any play between the shaped tangs and recesses can be eliminated. In this manner an effective connection in the radial direction of the expansion sleeve between the edge region of the tangs and the recesses is afforded.

The sides of the tangs and the recesses, that is, the surfaces extending in the circumferential direction can be provided with a stepped configuration as well as one without steps. To achieve a particularly high stressing of the expansion sleeve in the circumferential direction, the surfaces of the tangs and the recesses extending in the circumferential direction can be provided symmetrically with relation to one another. In this way, a uniform abutment of the tangs and the recesses on the opposite sides is attained.

In another embodiment of the present invention, the central region of the tangs extending in the circumferential direction of the sleeve has a smaller dimension and the recesses have a smaller corresponding depth. With such a shape, if the tangs are introduced into the recesses in the circumferential direction, the leading edge or face of the tangs contacts the smaller depth of the recess with the tangs being deformed according to the side contours of the recesses. Accordingly, it is especially possible to create a good gripping action with subsequent deformation of the tangs in the recesses.

In another embodiment of the invention, the expansion sleeve in the region of the tangs and recesses has an inside surface expanded to the nominal diameter of the thread. Accordingly, this region is free of the threads and has particular manufacturing advantages. The deformation or calibrating of the tangs and recesses can be effected in such a way that the expansion sleeve supports itself on the inside with the threadfree region on an anvil so that the stamping member can act on the expansion sleeve from the outside. In this manner particularly short flow times can be achieved during fabrication.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an elevational view of an expansion dowel embodying the present invention;

FIG. 2 is an axially extending sectional view of the expansion dowel as shown in FIG. 1 taken along the line II—II in FIG. 1;

FIG. 3 is a somewhat enlarged partial elevational view of an expansion dowel similar to FIG. 1 illustrating another embodiment of the trailing end part of the dowel prior to the completion of the rolling operation;

FIG. 4 is a plan view of the dowel shown in FIG. 3 taken in the direction of the arrow IV;

FIG. 5 is a plan view of the dowel illustrated in FIG. 3, however, displaying the dowel after the completion of the rolling operation;

FIG. 12 is still another embodiment of the present invention similar to the elevational view set forth in FIG. 8;

FIG. 13 is an enlarged partial sectional view taken along the line XIII—XIII in FIG. 12;

FIG. 14 is another partial elevational view of the expansion dowel displayed in FIG. 12 with the axial joint edges being welded; and FIG. 15 is an enlarged sectional view taken along the line XV—XV in FIG. 14.

DETAILED DESCRIPTION OF THE INVENTION

Figure 6:
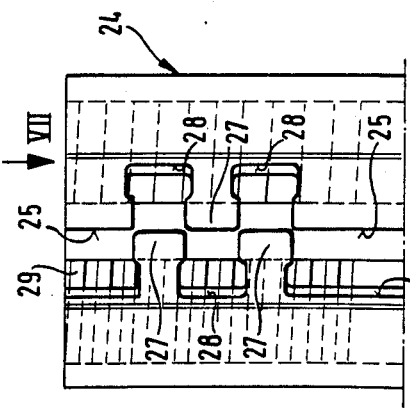
FIG. 6 is another embodiment of an expansion dowel embodying the present invention shown in a partial elevational view similar to FIG. 3.

In FIG. 1 an expansion dowel 1 is displayed made up of an axially extending expansion sleeve 2 including a wedge-shaped expansion member 3.

As viewed in the various figures the upper end of the expansion dowel is its trailing end and the lower end is its leading end, that is, the end inserted first into a borehole or other opening in which the expansion dowel is to be anchored.

Expansion member 3 is positioned within a recess or opening 4 formed in the expansion sleeve with the sides of the opening extending generally in the axial direction of the sleeve converging inwardly toward the lower or leading end of the sleeve. As shown in FIG. 2, the expansion member is secured at the trailing end by a breakable or severable connecting web 5 to the expansion sleeve 2. Adjacent the web 5, the expansion member has an inwardly directed projection 6 extending into the central bore formed within the expansion sleeve 2. Diametrically opposite the expansion member is a recessed guidance surface for an installation tool.

To install the expansion dowel 1 it is introduced into a borehole in a receiving material and a bolt-shaped installation tool is driven from the trailing end into the central bore 7. The installation tool, not shown, contacts the inwardly directed projection 6 and effects a rupture of the connecting web 5 so that the expansion member 3 can be displaced in the axial direction within the opening or recess 4 toward the leading end of the sleeve. Due to the wedge-like shape of the expansion member and the corresponding wedge-shape of the opening 4, the expansion sleeve is expanded from the leading end toward the trailing end. The expansion secures the sleeve in the receiving material. After the installation tool is withdrawn, a threaded bolt is screwed into the thread 9 in the sleeve extending from the trailing end for fastening or attaching a load to the sleeve. Radial forces acting outwardly while the threaded bolt is tightened in the threaded region of the expansion sleeve do not cause a widening of the expansion sleeve which is rolled out of a section of sheet metal because of the gripping interaction of the tangs 11 and the openings or recesses 12 formed along the axially extending edges of the sleeve. The alternating tangs 11 and recesses 12 are formed along the axially extending edges 13, 14 of the expansion sleeve and form a butt joint. The tangs 11 and recesses 12 are symmetrical relative to one another so that they afford interengagement. As indicated in FIG. 2, in the central region of the tangs 11 the length or circumferential dimension of the tangs L is smaller than the remainder of the circumferential dimension of the tang and the recesses 12 have a similar smaller depth T.

In the partial elevational view set forth in FIG. 3 the dowel has the same expansion arrangement as provided in FIGS. 1 and 2. The dowel includes an expansion sleeve 16 with a pair of axially extending edges 17, 18 with alternately arranged symmetrically shaped tangs 19 and recesses 21. The dimension W of the recesses extending in the axial direction at the axially extending edges is smaller than the corresponding axial dimension of the recesses spaced circumferentially from the axial edges. The tangs 19 are shaped corresponding to the shape of the recesses 21. When the tangs and the recesses interengage there is a gripping engagement due to the dove-tail like connection provided between the tangs and the recesses. In FIG. 4 the sheet metal section forms an almost complete cylindrical sleeve with the tangs 19 shown positioned radially outwardly from the recesses 21. At the completion of the rolling operation the tangs 19 are moved radially inwardly interengaging with the recesses 21 for securing the axially extending edges 17 and 18 along the butt joint together. When a threaded bolt, not shown, is screwed into the thread 22 in the interior of the sleeve 16, the interengagement of the tangs and the recesses assures that the sleeve does not widen or open up along the axially extending butt joint formed by the edges 17, 18.

Figure 7:
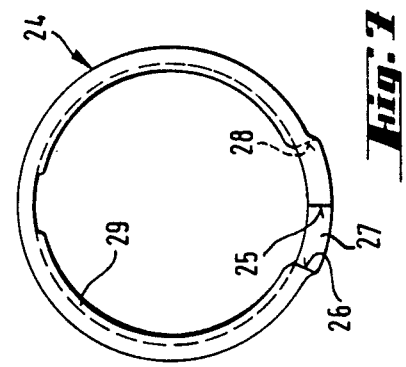
FIG. 7 is a plan view of the expansion dowel shown in FIG. 6 as viewed in the direction of the arrow VII in FIG. 6.

In FIG. 6 an expansion sleeve 24 is shown toward the end of the rolling operation but before the operation has been completed. The axially extending edges 25, 26 of the sheet metal section are provided with alternating and symmetrically shaped tangs 27 and recesses 28. The axially extending region of the expansion sleeve containing a tang 27 and a recess 28 is embossed or displaced radially outwardly by the depth of a thread 29, note FIG. 7. In the outwardly displaced region of the tangs and the recesses, there are no threads formed. In other words, as can be seen in FIG. 6, the threads are interrupted in the circumferential extending region of the tangs and the recesses.

Figure 8:
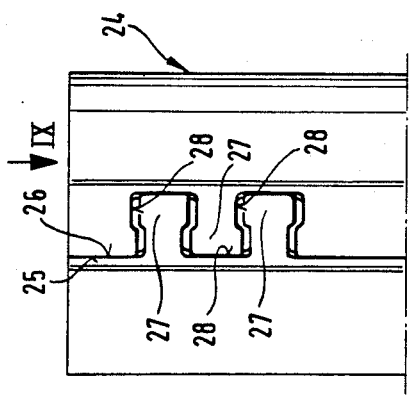
FIG. 8 is an elevational view of the dowel displayed in FIG. 6 after the completion of the rolling operation.
Figure 10:
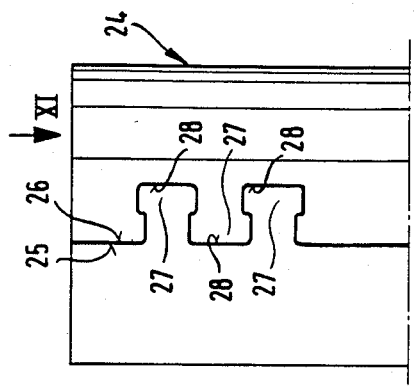
FIG. 10 is an elevational view of the dowel illustrated in FIG. 6 after the calibration or deformation of the interengaging members.
Figure 9:
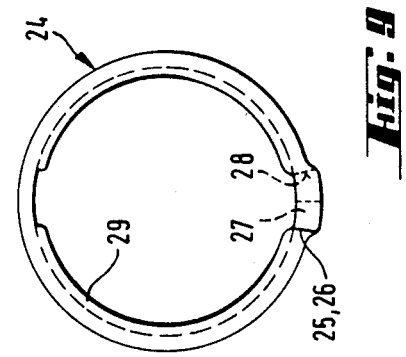
FIG. 9 is a plan view of the expansion dowel shown in FIG. 8 and viewed in the direction of the arrow IX in FIG. 8.
Figure 11:
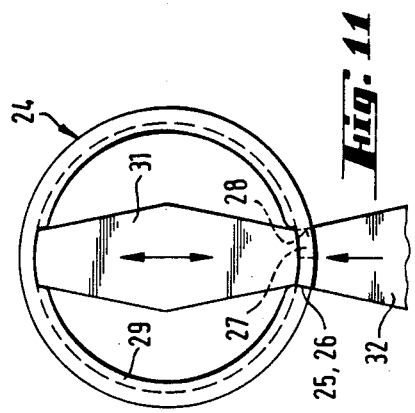
FIG. 11 is a plan view of the expansion dowel displayed in FIG. 10 taken in the direction of the arrow XI in FIG. 10 and displaying the calibrating or deforming tools used.

As viewed in FIG. 6, the tangs have a T-shaped configuration and the recesses 28 are similarly shaped. The axial dimension of the head of the T corresponds to the axial dimension of the opening into the recesses 28. Accordingly, at the completion of the rolling operation, the tangs can be inserted in the circumferential direction of the expansion sleeve into the recesses, note FIGS. 8 and 9. By a subsequent calibration operation or a deformation using an anvil 31 placed within the sleeve fitting into the thread-free region of the tangs 27 and the recesses 28 and in the oppositely disposed recess, and with a calibrating or deforming stamp 32 acting on the outside of the expansion sleeve opposite the anvil, the tangs 27 are increased in size to fill completely the recesses 28. FIGS. 10 and 11 display the expansion sleeve 24 which has been completed in the above manner.

In FIG. 12 a rolled expansion sleeve 34 is shown. The sleeve has axially extending edges 35, 36 forming the butt joint of the rolled sleeve. Tangs 37, extending circumferentially from the axially extending edge 35, extend into recesses 38 in the oppositely disposed axially extending edge 36. The interior of the expansion sleeve 34 extending from its trailing end, that is, the upper end, is provided with a thread 39, note FIG. 13. Along one axially extending edge 35 and on the axially extending edge of the tangs 37 thereon, a triangularly shaped web 41 is provided, note the cross-section in FIG. 13 and the web is in contact with the axially extending edge 36 and the corresponding axially extending edge in the recess 38. At the end of the rolling of the expansion sleeve 34, the tangs 37 enter into the recesses 38 and thus assure a continuous transition of the thread turns across the butt joint. When the rolling operation is completed, the axially extending edge 35 is secured to the axially extending edge 36 by means of a pulsed current arc-welding process involving the melting of the webs 41. FIGS. 14 and 15 display the welded expansion sleeve 34 which can be stressed or loaded in the circumferential direction.

In the various embodiments described above, the thread 9, 22, 29, 39 is stamped in the inside surface of the sheet metal section before the rolling operation is performed. The formation of the thread in this manner represents a simple procedure which reflects a savings in time and costs.

While specific embodiments of the invention have been shown and described in detail to illustrate the application of the inventive principles, it will be understood that the invention may be embodied otherwise without departing from such principles.

We claim:

1. Expansion dowel comprising an axially extending expansion sleeve including an expansion member rolled from a section of sheet metal, said expansion sleeve having a leading end arranged to be inserted first into a borehole formed in a receiving material and a trailing end, the rolled said sleeve having a pair of edges extending in the leading end-trailing end direction and forming a butt joint, a thread formed on the inside surface of the said sleeve extending from the trailing end to a location intermediate the trailing end and the leading end, said sleeve having an opening therein extending in the axial and circumferential direction with the opening converging in the axial direction toward the leading end, and said expansion member located within said opening, wherein the improvement comprises at least one of said edges having a recess formed therein extending in the circumferential direction from said edge and the other said edge having a tang extending therefrom in the circumferential direction of said sleeve so that said tang fits in interengagement in said recess when said edges from the butt joint, said expansion member is secured to said sleeve by a breakable web, and said expansion member has an inwardly directed projection extending into the interior of said sleeve so that an installation tool can be inserted from the trailing end of said sleeve against said projection for effecting the separation of said expansion member at said web from said sleeve and for displacing said expansion member within the opening in said sleeve in the direction toward the leading of said sleeve.

2. Expansion dowel comprising an axially extending expansion sleeve including an expansion member rolled from a section of sheet metal, said expansion sleeve having a leading end arranged to be inserted first into a borehole formed in a receiving material and a trailing end, the rolled said sleeve having a pair of edges extending in the leading end-trailing end direction and forming a butt joint, a thread formed on the inside surface of the said sleeve extending from the trailing end to a location intermediate the trailing end and the leading end, said sleeve having an opening therein extending in the axial and circumferential direction with the opening converging in the axial direction toward the leading end, and said expansion member located within said opening, therein the improvement comprises at least one of said edges having a recess formed therein extending in the circumferential direction from said edge and the other said edge having a tang extending therefrom in the circumferential direction of said sleeve so that said tang fits in interengagement in said recess when said edges form the butt joint, said tang and said recess is T-shaped in the circumferential direction of said sleeve with said tang having a smaller shape than said recess so that said tang can be inserted circumferentially into said recess during the rolling operation and said tang can be deformed to fit tightly in said recess.

3. Expansion dowel comprising an axially extending expansion sleeve including an expansion member rolled from a section of sheet metal, said expansion sleeve having a leading end arranged to be inserted first into a borehole formed in a receiving material and a trailing end, the rolled said sleeve having a pair of edges extending in the leading end-trailing end direction and forming a butt joint, a thread formed on the inside surface of the said sleeve extending from the trailing end to a location intermediate the trailing end and the leading end, said sleeve having an opening therein extending in the axial and circumferential direction with the opening converging in the axial direction toward the leading end, and said expansion member located within said opening, wherein the improvement comprises at least one of said edges having a recess formed therein extending in the circumferential direction from said edge and the other said edge having a tang extending therefrom in the circumferential direction of said sleeve so that said tang fits in interengagement in said recess when said edges form the butt joint, said tang and said edge extending in the leading end-trailing end direction from which said tang extends has an outwardly extending projection with a triangular cross-section viewed transversely of the leading end-trailing end direction of said sleeve, and said projection arranged to form a welded connection with the oppositely disposed surface of said recess when the rolling of said sleeve is completed and a pulsed current are welding process is applied for melting the web.

4. Expansion dowel comprising an axially extending expansion sleeve including an expansion member rolled from a section of sheet metal, said expansion sleeve having a leading end arranged to be inserted first into a borehole formed in a receiving material and a trailing end, the rolled said sleeve having a pair of edges extending in the leading end-trailing end direction and forming a butt joint, a thread formed on the inside surface of the said sleeve extending from the trailing end to a location intermediate the trailing end and the leading end, said sleeve having an opening therein extending in the axial and circumferential direction with the opening converging in the axial direction toward the leading end, and said expansion member located within said opening, wherein the improvement comprises at least one of said edges having a recess formed therein extending in the circumferential direction from said edge and the other said edge having a tang extending therefrom in the circumferential direction of said sleeve so that said tang fits in interengagement in said recess when said edges form the butt joint, the inside surface of said expansion sleeve in the region formed by the tang and the recess and the diametrically opposite inside surface of said sleeve is recessed outwardly to the nominal diameter of the thread.

5. Expansion dowel, as set forth in claim 1, wherein the dimension of said recess at said edge forming the butt joint extending in the leading end-trailing end direction is smaller than the dimension of the recess extending in the leading end-trailing end direction of and spaced circumferentially from said edge forming the butt joint.

6. Expansion dowel, as set forth in claim 4 or 5, wherein said tang has an edge connected to the edge of said sleeve extending in the leading end-trailing end direction and a free edge spaced circumferentially from the connected edge and extending in the leading end-trailing end direction with the dimension of the free edge being greater in the leading end-trailing end direction than the connected edge.

7. Expansion dowel, as set forth in claim 6, wherein the dimension of the free edge of the tang extending in the leading end-trailing end direction is greater than the dimension of the opening into the recess along the leading end-trailing end edge forming the butt joint.

8. Expansion dowel, as set forth in claim 4 or 5, wherein the shape of the tang and of the corresponding recess is similar and is symmetrical with respect to one another.

9. Expansion dowel, as set forth in claim 4 or 5, wherein said tang has a dimension in the circumferential direction of said sleeve spaced between the circumferentially extending edges of said tang which is smaller than the circumferential dimension of the circumferentially extending edges of said tang and said recess has a dimension extending in the circumferential direction and spaced between the circumferentially extending edges of said recess which is smaller than the circumferential dimension of the circumferentially extending edge of the recess.

10. Expansion dowel, as set forth in claim 4, wherein said tang and said recess have a dove-tail like configuration so that said tang interengages with said recess for securing the leading end-trailing end edges forming the butt joint of the sleeve in closely fitting relation.

11. Expansion dowel, as set forth in claim 4, wherein said expansion member has a pair of circumferentially spaced edges extending generally in the leading end-trailing end direction and said edges being disposed in converging relationship in the direction toward the leading end of said sleeve.

* * * * *